US011448733B2

(12) United States Patent
Wohlgenannt et al.

(10) Patent No.: US 11,448,733 B2
(45) Date of Patent: Sep. 20, 2022

(54) MEASURING APPARATUS FOR GEOMETRIC 3D SCANNING OF SURROUNDINGS WITH A MULTIPLICITY OF TRANSMISSION CHANNELS AND SEMICONDUCTOR PHOTOMULTIPLIER SENSORS

(71) Applicant: HEXAGON TECHNOLOGY CENTER GMBH, Heerbrugg (CH)

(72) Inventors: Rainer Wohlgenannt, Klaus (AT); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 543 days.

(21) Appl. No.: 16/591,464

(22) Filed: Oct. 2, 2019

(65) Prior Publication Data
US 2020/0110159 A1 Apr. 9, 2020

(30) Foreign Application Priority Data
Oct. 3, 2018 (EP) .................................... 18198425

(51) Int. Cl.
*G01S 7/48* (2006.01)
*G01S 7/481* (2006.01)
(Continued)

(52) U.S. Cl.
CPC .......... *G01S 7/4817* (2013.01); *G01C 15/006* (2013.01); *G01S 7/4811* (2013.01);
(Continued)

(58) Field of Classification Search
None
See application file for complete search history.

(56) References Cited

U.S. PATENT DOCUMENTS 4,939,379 A 7/1990 Horn
5,142,505 A 8/1992 Peynaud
(Continued)

FOREIGN PATENT DOCUMENTS

CN 102589476 A 7/2012
CN 104620129 A 5/2015
(Continued)

OTHER PUBLICATIONS

European Search Report dated Nov. 5, 2018 as received in Application No. 18198425.3.

*Primary Examiner* — Eileen M Adams
(74) *Attorney, Agent, or Firm* — Maschoff Brennan (57) ABSTRACT

A measuring apparatus for the three-dimensional geometric acquisition of surroundings by means of a rotating transceiver platform and a multiplicity of transmission channels for emitting pulsed distance measurement beams, wherein in each case a different elevation with respect to a reference plane orthogonal to the rotation axis is scannable with each of the transmission channels. Furthermore, the measuring apparatus comprises a receiving unit having a sensor arrangement of semiconductor photomultiplier sensors, wherein the number of sensors is less than the number of transmission channels, and the transmitting unit and the receiving unit are configured such that at least two of the transmission channels are assigned to a common sensor, which is configured for generating distance measurement data with respect to the at least two transmission channels.

15 Claims, 9 Drawing Sheets

(51) Int. Cl.
  *G01C 15/00*    (2006.01)
  *G01S 7/4863*   (2020.01)
  *G01S 7/4865*   (2020.01)
  *G01S 17/89*    (2020.01)

(52) U.S. Cl.
  CPC .......... *G01S 7/4818* (2013.01); *G01S 7/4863* (2013.01); *G01S 7/4865* (2013.01); *G01S 17/89* (2013.01)

(56) References Cited

U.S. PATENT DOCUMENTS

| | | |
|---|---|---|
| 2014/0078519 A1 | 3/2014 | Steffey et al. |
| 2015/0042977 A1* | 2/2015 | Siercks ................ G01S 7/4817 356/4.01 |
| 2015/0185327 A1* | 7/2015 | Boeckem ............... G01C 15/04 356/4.01 |
| 2015/0226677 A1 | 8/2015 | Sullivan et al. |
| 2016/0300383 A1* | 10/2016 | Liu ........................... G06T 7/80 |
| 2017/0155225 A1 | 6/2017 | Villeneuve et al. |
| 2018/0143305 A1 | 5/2018 | Buskila et al. |
| 2018/0156895 A1 | 6/2018 | Hinderling et al. |

FOREIGN PATENT DOCUMENTS

| | | |
|---|---|---|
| CN | 105980908 A | 9/2016 |
| CN | 108603758 A | 9/2018 |
| EP | 1 832 897 B1 | 11/2010 |
| EP | 2 317 347 A2 | 5/2011 |
| EP | 3 226 029 A1 | 10/2017 |
| EP | 3 324 203 A1 | 5/2018 |
| FR | 2646925 A1 | 11/1990 |
| JP | 2015141160 A | 8/2015 |

\* cited by examiner

MEASURING APPARATUS FOR GEOMETRIC 3D SCANNING OF SURROUNDINGS WITH A MULTIPLICITY OF TRANSMISSION CHANNELS AND SEMICONDUCTOR PHOTOMULTIPLIER SENSORS

CROSS-REFERENCE TO RELATED APPLICATIONS

This application claims priority to European Patent Application No. 18198425.3 filed on Oct. 3, 2018, which is incorporated herein by reference.

FIELD OF THE INVENTION

The invention relates to a measuring apparatus for the three-dimensional geometric acquisition of surroundings by means of a multiplicity of transmission channels.

BACKGROUND

In order to acquire objects or surfaces in surroundings, use is often made of methods which carry out scanning by means of a distance measurement beam, e.g. a directional pulsed laser beam of a laser scanner. Here in each case the spatial position of a surface point is acquired by the distance to the targeted surface point being measured by means of the laser and this measurement being combined with angle information of the laser emission. From this distance information and this angle information, it is possible to determine the spatial location of the acquired point and to measure a surface, for example.

Typical 3D measuring apparatuses are able to guide the distance measurement beam of a distance measuring device over a surface or along an edge and thus, with a predefined scanning or measurement rate, progressively for different measurement directions, simultaneously to acquire the direction and distance to the respective measurement points. In this case, the direction and distance are relative to a measurement reference point such as e.g. the location or zero point of the measuring apparatus, in other words lie in a common reference or coordinate system, such that, therefore, the individual measurement directions and thus the individual measurement data are linked with one another by way of the local coordinate system. From the distance measurement value and the measurement direction correlated therewith for each point, a so-called 3D point cloud can thus subsequently be generated from the multiplicity of scanned points, for example by means of an integrated or external data processing system.

Often, in parallel with this purely geometric acquisition of the surface, an image recording is additionally carried out by a camera, this providing not only the visual overall view but also further information, e.g. with respect to the surface texture.

In particular, the 3D acquisition can also be carried out during a spatial movement of the measuring apparatus, wherein the own movement of the measuring apparatus can be acquired and taken into account for example by means of a global satellite positioning system (GSNS, "global navigation satellite system"), by means of an inertial measuring system (IMU, "inertial measuring unit"), and/or by means of simultaneous position determination and mapping (SLAM, "Simultaneous Localization and Mapping").

3D scanning is a very effective technology for producing millions of individual measurement data, in particular 3D coordinates, within minutes or seconds. Typical measurement tasks are, for example, the recording of objects or the surfaces thereof in the construction field, in mining, or in industrial installations, the recording of building façades or historic buildings, or the recording of accident locations and crime scenes. Further 3D measurement tasks reside, for example, in the monitoring of surroundings, for example in the context of a warning or supervisory system for an industrial manufacturing installation or in the context of use in driving assistance systems. Furthermore, 3D scanning is used for example for recognition, classification, or measurement of objects moving past the measuring apparatus, e.g. persons, vehicles, or workpieces.

Various principles and methods are known in the field of electronic or electro-optical distance measurement. One approach consists in emitting pulsed electromagnetic radiation, such as e.g. laser light, at a target to be measured and subsequently receiving an echo from said target as backscattering object, wherein the distance to the target to be measured can be determined for example on the basis of the time of flight, the shape, and/or the phase of the pulse. Such laser distance measuring devices have in the meantime gained acceptance as standard solutions in many fields.

The backscattered pulse or a pulse sequence is detected mainly by the use of two different approaches or a combination thereof.

In the case of the so-called threshold value method, a light pulse is detected if the intensity of the radiation incident on a detector of the distance measuring apparatus used exceeds a certain threshold value. Said threshold value prevents noise and interference signals from the background from being incorrectly detected as a useful signal, i.e. as backscattered light of the emitted pulse.

The other approach is based on the sampling of the backscattered pulse. This method can also be regarded as integrated signal acquisition, wherein both the entire signal information and the significant noise information are acquired by the sampling, which leads to an increase in the measurement accuracy. An emitted signal is detected by a procedure in which the radiation acquired by a detector is sampled, a signal is identified within the sampled region and, finally, a position of the signal is determined temporally. By means of the use of a multiplicity of samples and/or summation of the reception signal synchronously with the emission rate, it is possible to identify a useful signal even under unfavorable circumstances, such that even relatively large distances or noisy background scenarios or background scenarios beset by interference can be dealt with.

Nowadays, often the entire waveform of the analog signal of the radiation acquired by a detector is sampled here by means of the waveform digitizing (WFD) method. After identification of the coding of the associated transmission signal (ASK, FSK, PSK, also called distance or interval modulation, etc.) of a received signal, a signal time of flight ("pulse time of flight") is determined very accurately for example by means of Fourier transformation or from a defined profile point of the sampled, digitized and reconstructed signal, such as the points of inflection, the curve maxima, or integrally by means of an optimum filter known from time interpolation.

By way of example, in the approach of temporally very precise sampling of the backscattered signal, the electrical signal generated by the detector is converted into a digital signal sequence by means of an analog-to-digital convertor (ADC). This digital signal is subsequently usually processed further in real time. In a first step, said signal sequence is decoded (ASK, FSK, PSK, etc.), that is to say recognized, by specific digital filters and, finally, the position of a signature describing a time interval within the signal sequence is determined. Examples of time-resolving signatures are centroid, sine-cosine transformation, functionals thereof, or for example amplitude-normalized FIR filters ("finite impulse response filter") with a weight coefficient set derived from the pulse shape. In order to eliminate possible distance drifts, a corresponding time-resolving signature is also compared with an internal start signal. In order to avoid irreversible sampling errors, additional digital signal transformations known to the person skilled in the art are applied.

One of the simplest types of modulation is the identification of the individual pulses or of the pulse sequences by distance coding, as described e.g. in EP 1 832 897 B1. This is used for example for the purpose of reidentifiability. This reidentification is necessary if an ambiguity arises, which may be brought about by various situations during the time-of-flight measurement of pulses, for example if more than one pulse or a group of pulses is situated between surveying apparatus and target object. What is advantageous, in particular, is pulse coding in multi-beam systems consisting of a plurality of jointly emitted laser beams and assigned reception sensors.

Multi-beam measuring apparatuses have various advantages, e.g. that even with a slower rotational speed of a transceiver unit, e.g. of a rotating beam deflection mirror or of a rotating transceiver platform, a higher point rate or a higher point density is achievable. However, individual partial beams of the jointly emitted laser beams have to be respectively aligned with assigned reception regions.

Furthermore, by way of example, interfering crosstalks can occur between individual reception beams, wherein a specific reception region assigned to a first beam detects light of a second beam emitted near the first beam. As a result, the distance measurement accuracy is limited, wherein in particular even erroneous measurements can be generated or individual measurement points for the 3D measurement have to be deleted.

In order to reduce or avoid crosstalks, various measures are known, e.g. reducing the scanning density, beam masking, e.g. by means of the use of LCDs, or complicated optical arrangements in order to precisely align a plurality of emitter-detector pairings.

SUMMARY

One object of some aspects of the present invention is to provide a multi-beam measuring apparatus for the three-dimensional geometric acquisition of surroundings with which the disadvantages known from the prior art are avoided, in particular wherein the complexity of the measuring apparatus is reduced but fast and precise measurements with a high point density are nevertheless made possible.

A further specific object of some aspects of the present invention is that of increasing the range of the multi-beam system.

A further specific object of the present invention is that of increasing the range of the multi-beam system.

These objects are achieved by the realization of the characterizing features of the independent claim. Features that develop the invention in an alternative or advantageous manner can be gathered from the dependent patent claims.

The invention relates to a measuring apparatus for the three-dimensional geometric acquisition of surroundings, comprising: a base; a transceiver platform rotatable about a rotation axis relative to the base, configured for rotating a beam exit region and a beam entrance region about the rotation axis; and a goniometer for acquiring angle data with respect to the angular orientation of the transceiver platform about the rotation axis.

The goniometer can be embodied for example as an angle encoder for incrementally determining angle changes. Furthermore, the goniometer can be configured for example to exactly detect only a specific angular position, for example by means of a switch, and to calculate or to interpolate the intermediate angles on the basis of the known rotational speed and the known time profiles and pulse rates.

The measuring apparatus has a transmitting unit having a multiplicity of n transmission channels for emitting pulsed distance measurement beams via the beam exit region, wherein in each case a different elevation with respect to a reference plane orthogonal to the rotation axis is scannable with each of the transmission channels.

For an azimuth setting of the transceiver platform, the transmission channels thus define (at least with respect to their elevation) different beam or scanning directions, wherein the transmission channels here can have a fixed arrangement with respect to the transceiver platform, i.e. wherein for example a plurality of distance measurement beams are generated in each case via separately progressing optical channels of the transceiver platform. Alternatively, however, at least one portion of the transmission channels can also be generated in such a way that different transmission channels/scanning directions are generated for example by means of a jointly useable distance measurement beam that is variable by way of a deflection element.

Furthermore, the measuring apparatus comprises a receiving unit and a computing unit, wherein the receiving unit is configured for acquiring pulsed distance measurement beams returning via the beam entrance region and for generating distance measurement data with respect to the multiplicity of transmission channels, and the computing unit is configured for deriving a three-dimensional point cloud on the basis of the angle data, the distance measurement data, and arrangement information indicative of the arrangement of the multiplicity of transmission channels.

Preferably, the beam exit region and the beam entrance region are embodied biaxially, wherein the biaxial offset is embodied perpendicular to a fanning of the n transmission channels, for example wherein the n transmission channels define a vertical fan plane.

The pulsed distance measurement beams and the distance measurement data are configured for a distance measurement according to the pulse flight principle, wherein the measuring apparatus can be configured in particular for determining the time of flight on the basis of the shape and/or the phase of a pulse, specifically by means of the WFD method.

The arrangement information makes it possible to draw a conclusion about a common reference system of the simultaneously activated transmission channels, such that the individual measurement directions and thus the individual distance measurements are linked with one another by means of the individual distance measurement beams of the transmission channels by way of a local coordinate system.

According to some embodiments of the present invention, the receiving unit comprises a sensor arrangement of m semiconductor photomultiplier sensors (SPM sensors), wherein each of the semiconductor photomultiplier sensors comprises in each case a multiplicity of microcells which in each case are based on an internal gain mechanism and operate in the Geiger mode, and the output values of the microcells of a respective semiconductor photomultiplier sensor in each case generate a common output signal.

As a result, it is possible to achieve a substantial independence between the number of transmission channels and reception regions for the individual transmission channels. In particular, a complex alignment of individual transmission channels with specifically assigned reception regions is unnecessary. An alignment merely has to be effected in such a way that distance measurement beams of different transmission channels that are active simultaneously are respectively imaged onto different SPM sensors.

Accordingly, according to some embodiments of the invention, m is less than n, and the transmitting unit and the receiving unit are configured such that at least two of the transmission channels of the multiplicity of transmission channels are assigned to a common semiconductor photomultiplier sensor of the sensor arrangement, which sensor is configured for generating the distance measurement data with respect to the at least two transmission channels.

So-called semiconductor photomultiplier sensors (SPM sensors), also referred to as SiPM (silicon photomultiplier), having a photosensitivity in the visible and near infrared spectral ranges are generally arranged as a matrix structure on a chip. In the visible and near ultraviolet spectral ranges, SiPMs are gradually superseding the photomultiplier tubes used hitherto, SiPMs having a high spectral sensitivity in particular in the visible wavelength range. In the prior art, SiPMs are obtainable, for example, which are sensitive right into the near infrared range to a wavelength of far beyond 900 nm. Commercial SPM sensors are also obtainable at wavelengths of between 800 nm and 1800 nm. These sensors principally consist of the semiconductor material InGaAs. These sensors, too, depending on the design, have an external or internal matrix structure over the photosensitive area.

The special characteristic of these SPM sensors is their very high photosensitivity, which is why they have been used hitherto in the case of very weak optical signals where just 1 to 50 photons impinge on the sensor. For example, this higher photosensitivity in comparison with conventional pin diodes and avalanche photodiodes (APDs) enables the range of the distance measuring device to be considerably increased.

Furthermore, SPM sensors operate with a low voltage, have a high gain and high photon detection efficiency, and are distinguished by a very high electronic bandwidth in the GHz range despite the large detection area of the individual pixels. This enables precise distance measurements with a high time resolution.

SPM sensors consist of hundreds, thousands, to more than tens of thousands of microcells and are thus able to receive pulses having thousands or hundreds of thousands of photons simultaneously. Typically, SPM sensors are operated in the overbreak mode (Geiger mode) and generate a signal response comparable to analog sensors, despite the internal digital architecture. When a microcell responds, it generates an individual discrete ("digital") voltage pulse, wherein the "analog" behavior arises as a result of the multiplicity of microcells each yielding a common discrete voltage pulse.

Once a microcell has been triggered by an optical pulse, it has a certain dead time in which it cannot be triggered anew ("recovery time"). This time corresponds to a multiple of the optical pulse width, for example. In other words, if a microcell has already been triggered, it can no longer be triggered by further impinging photons of the same optical excitation pulse. The greater the number of microcells that have already been excited, then, the lower the number of remaining microcells that can be excited by a photon of the optical excitation pulse. The resultant characteristic corresponds to a negative exponential characteristic curve, i.e. an inherent reduction of the dynamic range, and affords a huge advantage in comparison with conventional avalanche photodiodes (PIN, APD), which change abruptly to a nonlinear behavior that can be controlled only with difficulty as soon as they are overridden.

Furthermore, by way of example, on account of the parallel connection of the many microcells to form microcell domains, even in the case of background solar light, there are still enough free cells for the signal photons.

SPM sensors are often used as an arrangement of a plurality of individual SPM sensors—each comprising a multiplicity of microcells—(so-called SPM array), wherein in each case the microcells of a respective SPM sensor are combined in a single common output.

In particular, SPM sensors afford the advantage, for example, that large-area sensors having a large photoactive area can be realized thereby. Such large-area sensors can be realized only with very great difficulty, or not at all, with APDs on account of the small photosensitive area.

In accordance with one embodiment, the receiving unit furthermore comprises k separable distance measurement channels, wherein k is less than or equal to m, and each of the semiconductor photomultiplier sensors of the sensor arrangement is assignable in each case to one of the k separable distance measurement channels. In this case, each of the k separable distance measurement channels is configured for generating distance measurement data with respect to a semiconductor photomultiplier sensor of the sensor arrangement that is assigned to it.

Consequently, individual transmission channels can thus be activated for example in quick succession or else simultaneously in groups, for example in order to achieve an increased point rate and an increased point density by means of the emission of transmission channel groups.

Accordingly, in a further embodiment, the transmitting unit is configured to activate a group of k simultaneously activatable transmission channels of the multiplicity of transmission channels as a first transmission channel group, wherein the transmitting unit and the receiving unit are configured such that the first transmission channel group, the sensor arrangement, and the separable distance measurement channels are activatable in a manner coordinated with one another, such that output signals of the sensor arrangement with respect to the k transmission channels of the first transmission channel group are acquirable simultaneously.

By way of example, the receiving unit comprises a channel selector, in particular a multiplexer, a data memory, and a distance measuring unit, wherein the channel selector is configured for selecting a group of semiconductor photomultiplier sensors of the sensor arrangement and for forwarding output signals of the group of semiconductor photomultiplier sensors to the data memory. The data memory is configured for storing data with respect to the output signals of the group of semiconductor photomultiplier sensors, and the distance measuring unit is configured for parallel and/or sequential generation of distance measurement data with respect to at least one portion of the semiconductor photomultiplier sensors of the group of semiconductor photomultiplier sensors.

In a further embodiment, the transmitting unit is configured to activate the multiplicity of transmission channels in such a way that a sequence of transmission intervals, in particular each of identical length, is generated, wherein during a respective transmission interval the first transmission channel group is activated and at least one further group of simultaneously activated transmission channels of the multiplicity of transmission channels is activated as second transmission channel group, wherein the first and second transmission channel groups are activated temporally successively in the respective transmission interval, the second transmission channel group is configured to scan intermediate elevations of elevations scanned by the first transmission channel group, and the transmitting unit and the receiving unit are configured such that the second transmission channel group, the sensor arrangement, and the separable distance measurement channels are activatable in a manner coordinated with one another, such that output signals of the sensor arrangement with respect to the transmission channels of the second transmission channel group are acquirable simultaneously.

Furthermore, the measuring apparatus can also be configured such that the time acquisition can also be effected in parallel. Accordingly, in accordance with a further embodiment, the receiving unit comprises a time acquisition unit having at least one of the following arrangements: a multichannel wavefront digitizer (WFD), a multichannel threshold value discriminator unit with time-to-delay convertors (TDC) connected downstream, and a field programmable gate array (FPGA) with multichannel time acquisition logic programmed in.

By means of a suitable choice of the ratio between the number of SPM sensors and transmission channels, the signal-to-noise ratio can be adapted, for example, by distance measurement beams that are emitted during a transmission interval being imaged onto SPM sensors adapted to the beam size.

By way of example, the sensor arrangement comprises at least two times k, in particular at least three times k, semiconductor photomultiplier sensors, wherein the receiving unit is configured such that each of the at least two times k, or three times k, semiconductor photomultiplier sensors is assignable in each case to one of the separable distance measurement channels.

In order to reduce the computational complexity for determining the point cloud, for example, it can be advantageous if the duration of the transmission interval is shorter than the time difference between successive transmission intervals. Accordingly, in accordance with a further embodiment, the transmitting unit is configured to generate the sequence of transmission intervals in such a way that the ratio of the transmission interval to the time difference between successive transmission intervals of the sequence of transmission intervals is less than 0.5.

For generating the multiplicity of transmission channels, the transmission channel comprises, for example, at least one of the following components: a laser diode, e.g. a pulsed laser diode, a stripe laser, and a laser bar, in particular wherein the transmitting unit comprises a fiber bundle and laser radiation of the component is coupled into a fiber bundle.

The laser beam sources can be arranged for example multiply on a carrier ("stacked") or in the laser chip ("multijunction" or "microstacked"), and/or as a laser array, e.g. in order to increase the power. Laser arrays (laser bars) are efficient and cost-effective arrangements of a plurality of individual laser diodes on a substrate/wafer, which entails for example advantages with regard to a small structural size of the optical unit. Moreover, it is thereby possible to realize for example smaller angles between the distance measurement beams and, consequently, a higher scanning density.

In another example, by means of a combination with fiber bundles arranged along the longitudinal axis of a stripe laser, a plurality of individual beams can be generated directly from the stripe laser and a plurality of optical fibers, wherein for example the fiber ends of the optical fibers are arranged in a perforated plate with suitable spacings in order to achieve the desired angular offset with one or more lens elements.

In accordance with a further embodiment, the transmission channel for generating the multiplicity of transmission channels comprises a first laser beam source and an optical beam splitter, wherein the laser beam source is configured for generating a first pulsed laser beam and the optical beam splitter is configured for splitting the first pulsed laser beam into a plurality of pulsed partial beams. The transmission channel is thus configured for generating the multiplicity of transmission channels on the basis of the plurality of pulsed partial beams (distance measurement beams) of the pulsed laser beam.

By way of example, the optical beam splitter comprises a Dammann grating, a fiber-optic splitter, a holographic element, and/or a diffractive optical element.

In particular, the optical beam splitter can be able to be switched in selectively, wherein a coarse scanning pattern is generated by means of separate laser beam sources, for example, and, as a result of the beam splitter being pivoted in, is split into a finer fine scanning pattern, which has a higher scanning density/point density in comparison with the coarse scanning pattern, that is to say enables a higher spatial measurement resolution. By way of example, as a result of the beam splitter being pivoted out, the intensity of the distance measurement beams of the individual transmission channels and hence the measurement range can be increased at the expense of the spatial resolution.

Accordingly, in accordance with a further embodiment, the transmission channel is configured for generating a first laser beam arrangement for providing a first scanning density, wherein the transmitting unit comprises a beam splitter unit, in particular the optical beam splitter described in the introduction, configured for splitting the first laser beam arrangement into a second laser beam arrangement, wherein the second laser beam arrangement provides a higher scanning density than the first laser beam arrangement. Furthermore, the transmitting unit is configured for coupling the beam splitter unit into and out of a beam path of the transmitting unit, for example at the level of the beam exit region, for generating the multiplicity of transmission channels as a coarse scanning pattern on the basis of the first laser beam arrangement, and for generating the multiplicity of transmission channels as a fine scanning pattern on the basis of the second laser beam arrangement.

In accordance with a further embodiment, the transmitting unit is configured such that the angle of incidence and/or the impingement point of the laser beam on the optical beam splitter is settable, and the multiplicity of transmission channels is generated on the basis of different settings of the angle of incidence and/or impingement point of the laser beam.

By way of example, a beam deflection of the first and/or second laser beam can be effected by an interposed optical element, e.g. a lens, a collimator, a mirror, e.g. MEMS, and/or a reflective or transmissive prism, being moved. Furthermore, the beam deflection can also be effected by the laser beams being moved either translationally or rotationally.

Alternatively, the multiplicity of transmission channels can be generated for example by means of the bending of a carrier. For example, for this purpose, the transmitting unit comprises a carrier configured for assuming at least two different bending states, and also an arrangement of a plurality of laser beam sources each defining a laser beam axis, said arrangement being arranged on the carrier.

Furthermore, the transmitting unit is configured to set the directions of the laser beam axes of the arrangement of laser beam sources as a function of the at least two different bending states, such that the multiplicity of transmission channels is generated on the basis of different settings of the bending states of the carrier. By way of example, the laser beam sources directly generate distance measurement beams of a fanned basic beam pattern, wherein the angles between the distance measurement beams are increased or decreased as a function of the bending state of the carrier.

Furthermore, the measuring apparatus can be configured for mechanically or optically generating different directions of propagation of an individual beam pattern made from distance measurement beams.

By way of example, in a further embodiment, the transmitting unit comprises a deflection unit configured for setting a direction of propagation of at least one part of the beam pattern, wherein the transmitting unit is configured for generating the multiplicity of transmission channels on the basis of different settings of the direction of propagation of the at least one part of the beam pattern.

In a further variant, at least one part of the transceiver platform is tiltable by a tilt angle with respect to the rotation axis, and the multiplicity of transmission channels is generated on the basis of differently set tilt angles, in particular wherein an extension of the elevation field of view of the measuring apparatus is generated by the differently set tilt angles.

BRIEF DESCRIPTION OF THE DRAWINGS

The measuring apparatus according to some embodiments of the invention and the various aspects of the invention are described in greater detail purely by way of example below on the basis of exemplary embodiments illustrated schematically in the drawings. In the figures, identical elements are identified by identical reference signs. The embodiments described are as a rule not illustrated in a manner true to scale, nor should they be understood as a limitation.

Specifically in the figures.

DETAILED DESCRIPTION

Figure 1:
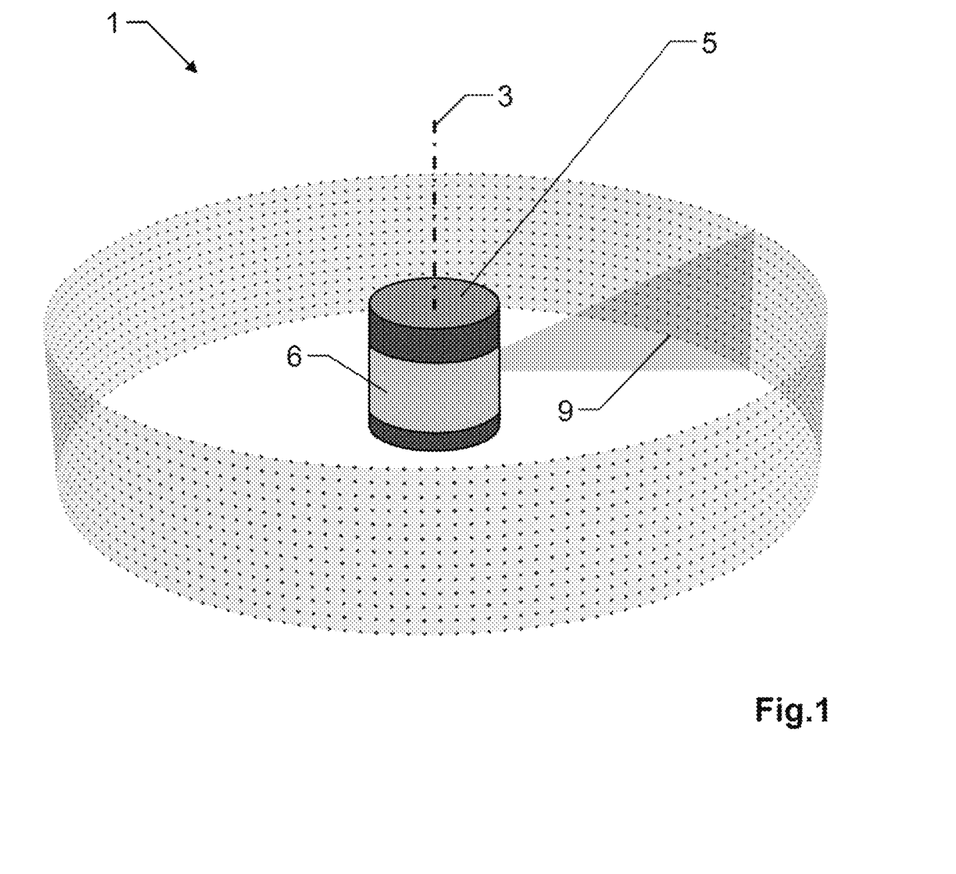
FIG. 1: shows an external view of an exemplary basic construction of the inventive measuring apparatus.
Figure 2A:
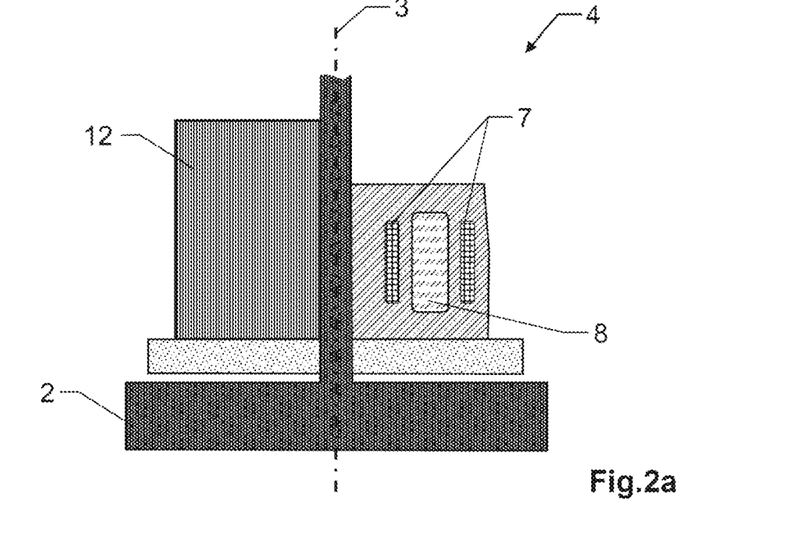
FIGS. 2a,b: show an internal view of the exemplary basic construction of the inventive measuring apparatus in a side view and a plan view.
Figure 2B:
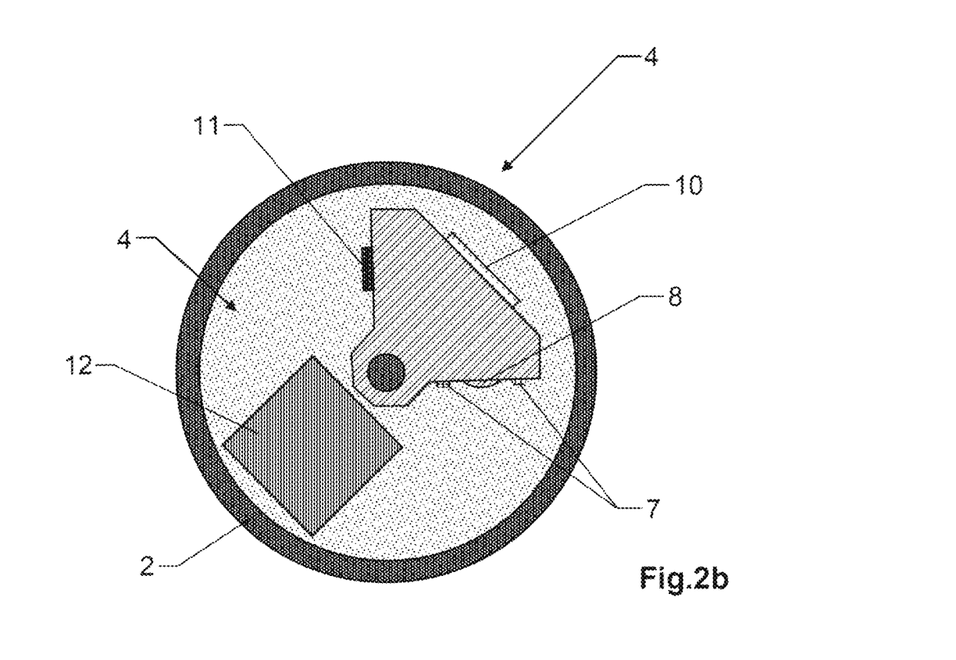

FIG. 1 and FIGS. 2a,b show an external view and respectively an internal side view and an internal plan view of an exemplary basic construction of the inventive measuring apparatus 1, embodied with a base 2 and a transceiver platform 4 arranged at the base in a manner rotatable about a rotation axis 3 relative to the base. In this case, the transceiver platform 4 is enclosed by a protective housing 5 fixed to the base 2 and having a circumferential radiation-transmissive window 6.

Alternatively, the protective housing 5 could for example also be configured to rotate concomitantly with the transceiver platform 4 in order for example to minimize the radiation-transmissive window 6, for example in a manner coordinated with the beam exit region 7 and the beam entrance region 8 of the transceiver platform 4.

In particular, the protective housing is for example dust-tight and/or water-tight (IP65), wherein the measuring apparatus is configured such that beam deflections of the transmission and reception beams are compensated for.

The measuring apparatus 1 is configured for generating a multiplicity of transmission channels for emitting pulsed distance measurement beams, wherein different elevations are scannable by different transmission channels. In this case, the elevation refers to an angle with respect to a reference plane orthogonal to the rotation axis 3. Given an exactly vertical orientation of the rotation axis 3, as illustrated in FIG. 2a, the elevation thus corresponds to the height above ground, for example at a specific distance. It goes without saying, however, that the measuring apparatus 1 can be arranged in any desired orientation with respect to the ground. By way of example, in the case of a horizontal orientation of the rotation axis 3, the elevation corresponds to a horizontal beam direction angle with respect to a vertical plane.

With the exemplary horizontal disposition of the measuring apparatus and thus vertical orientation of the rotation axis 3 as shown in FIG. 2a, the multiplicity of transmission channels thus defines a fan 9 (lying in a vertical plane) composed of distance measurement beams, said fan rotating about the rotation axis 3.

As a result, upon rotation of the fan 9 about the rotation axis 3, it is possible to scan for example a circumferential field of view (field of the scan region), e.g. of 360°×25°, or, by means of an azimuthal pivot movement (so-called "sweep mode"), a partial field of view, e.g. 80°×25°. Furthermore, the vertical field of view can be extended for example by tilting the transceiver platform 4 with respect to the rotation axis 3, for example to 360°×40°.

Figure 8:
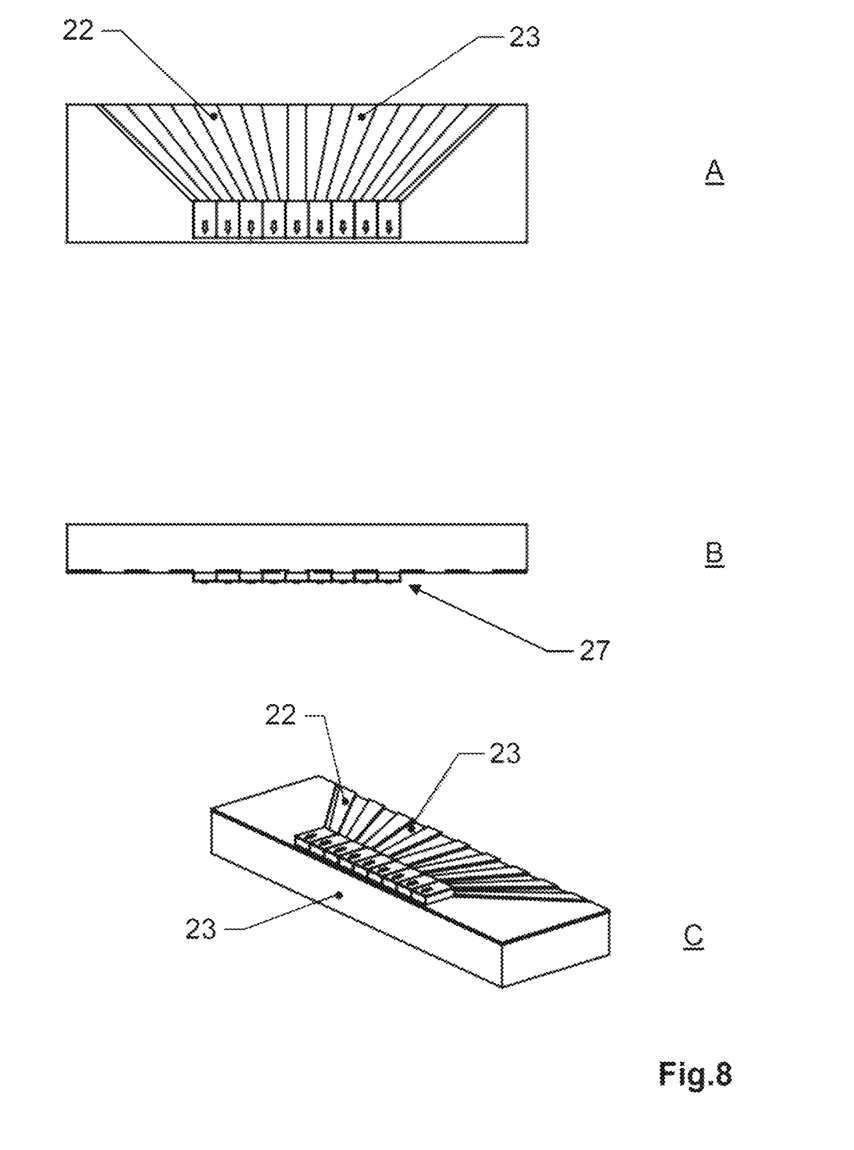
FIG. 8: shows a schematic illustration of a laser array.
Figure 9:
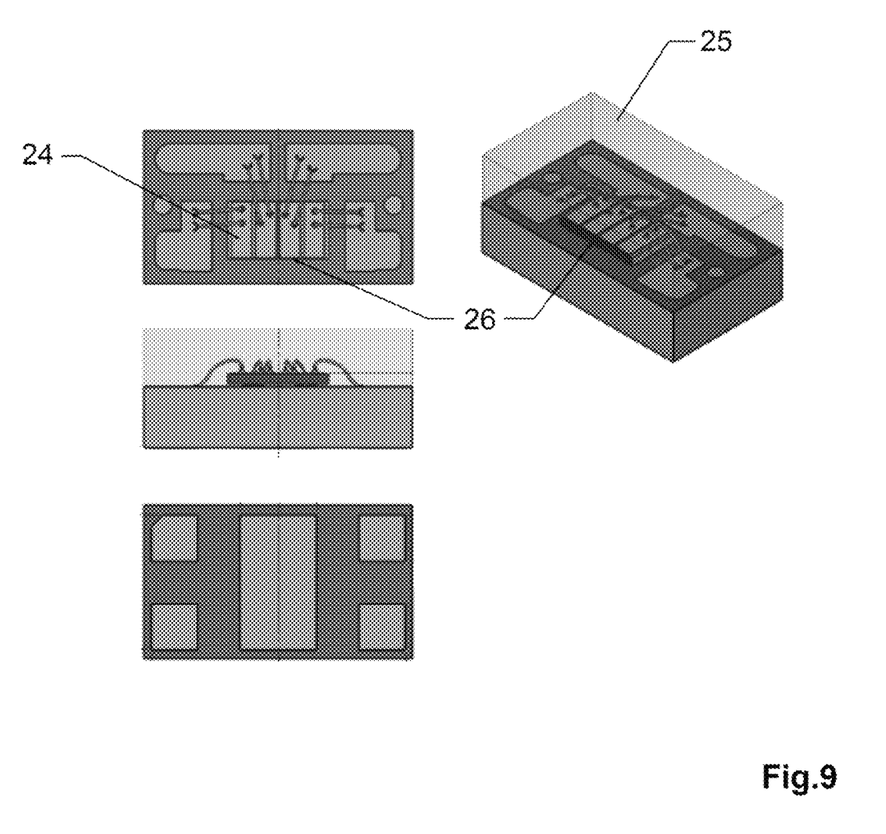
FIG. 9: shows a schematic illustration of a commercial laser unit.

By way of example, the multiplicity of transmission channels is denoted by means of a plurality of laser emitters spaced apart vertically, for example by means of a laser array as illustrated in FIGS. 8 and 9, wherein for example the transmitter and receiver apertures 7, 8, as illustrated in FIGS. 2a, 2b, are arranged in a manner spaced apart horizontally.

Returning distance measurement beams of the different transmission channels, said distance measurement beams being acquired by the receiver aperture 8, are directed for example via lens systems and optical deflection means 10 onto a sensor arrangement 11 of semiconductor photomultiplier sensors (SPM sensors), said sensor arrangement being configured for distance measurements, wherein distance measurement data with respect to the multiplicity of transmission channels are generated by means of reception electronics (not shown).

Furthermore, the transceiver platform 4 also comprises for example a computing unit 12 configured for deriving a three-dimensional point cloud on the basis of angle data with respect to the angular orientation of the transceiver platform 4 about the rotation axis 3, the distance measurement data, and arrangement information indicative of the arrangement of the multiplicity of transmission channels. Alternatively, the computing unit can also be arranged in a static fashion, for example in the base 2.

Figure 3:
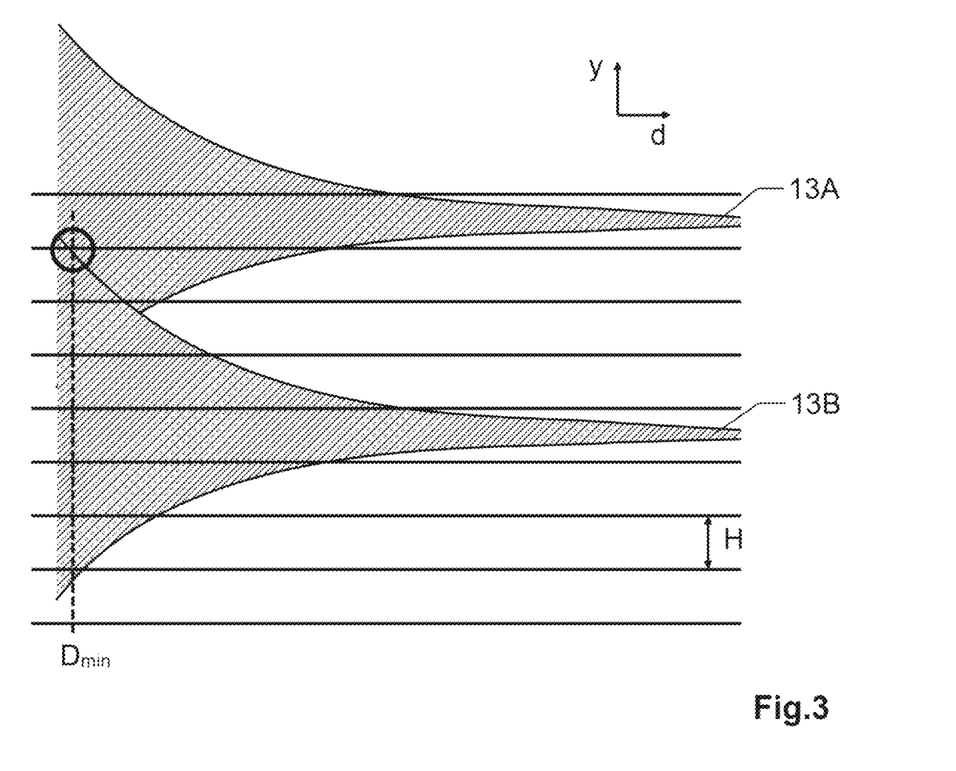
FIG. 3: shows the dependence of the laser spot size at the detector on the measurement distance, which leads to distance-dependent crosstalks between simultaneously activated transmission channels.

FIG. 3 shows by way of example the problem of distance-dependent crosstalks between simultaneously activated transmission channels, in particular for short measurement distances.

The figure refers once again to the exemplary horizontal disposition of the measuring apparatus 1 as illustrated in FIGS. 2a, 2b, wherein the y-direction corresponds to the (vertical) direction of the rotation axis 3. The illustration shows here in the y-direction in each case as a function of the measurement distance d the vertical spot extent of an imaging of two distance measurement beams 13A, 13B emitted simultaneously with a vertical offset, and the vertical width H (the "height") of separate detection regions (pixels) of the sensor area.

Firstly, the distance measurement beams of different transmission channels are arranged biaxially with respect to the receiver axis in the vertical direction as a result of a vertical offset of the laser emitters, which is difficult to prevent, and, particularly in the case of short distances, this can lead to an intensified distance-dependent vertical displacement of the laser spots on the sensor area, that is to say in the direction of detection regions assigned to the closest adjacent transmission channels. Furthermore, on account of defocusing, the size of the laser spot imaged on the sensor area typically increases as the distance becomes shorter.

Accordingly, in the case of shorter distances, the (vertical) laser spot extent exceeds the vertical pixel size H of the sensor area, wherein, in the case of a distance smaller than a minimum distance $D_{min}$, a crosstalk occurs between the two simultaneously active channels, i.e. wherein the distance measurement of the channel actually assigned to the detection region has radiation from the other channel and is therefore disturbed.

According to the present invention, therefore, transmission channels scanning different elevations are activated temporally successively, such that for example angular separations between individual distance measurement beams emitted simultaneously can be chosen to be large enough to avoid crosstalks at the receiver end.

Furthermore, a sensor arrangement 11 of semiconductor photomultiplier sensors (SPM sensors) is used at the receiver end, which sensors make possible distance measurements with a high time resolution. Furthermore, SPM sensors afford the advantage, for example, that it is thereby possible to realize large-area sensors having a large photoactive area and a high frequency bandwidth (up to a plurality of GHz).

Referring to the exemplary horizontal disposition of the measuring apparatus as illustrated in FIG. 2a, the sensor arrangement 11 comprises for example a plurality of semiconductor photomultiplier sensors arranged vertically one above another, wherein the output values of the microcells of the same semiconductor photomultiplier sensor in each case generate a common output signal.

As a result, it is possible for example to achieve a substantial independence between the number of transmission channels and the number of reception channels (SPM sensors). In particular, a complex alignment of individual transmission channels with specifically assigned reception regions is unnecessary. An alignment merely has to be effected in such a way that simultaneously emitted distance measurement beams of different transmission channels are respectively imaged onto different SPM sensors of the sensor arrangement 11. In other words: by virtue of the large-area SPM sensors having a high time resolution, the number of SPM sensors can be smaller than the number of transmission channels, wherein nevertheless a high scanning rate can be maintained and during a revolution of the transceiver platform 4 it is possible to effect repeated scanning by means of the multiplicity of transmission channels.

Figure 4:
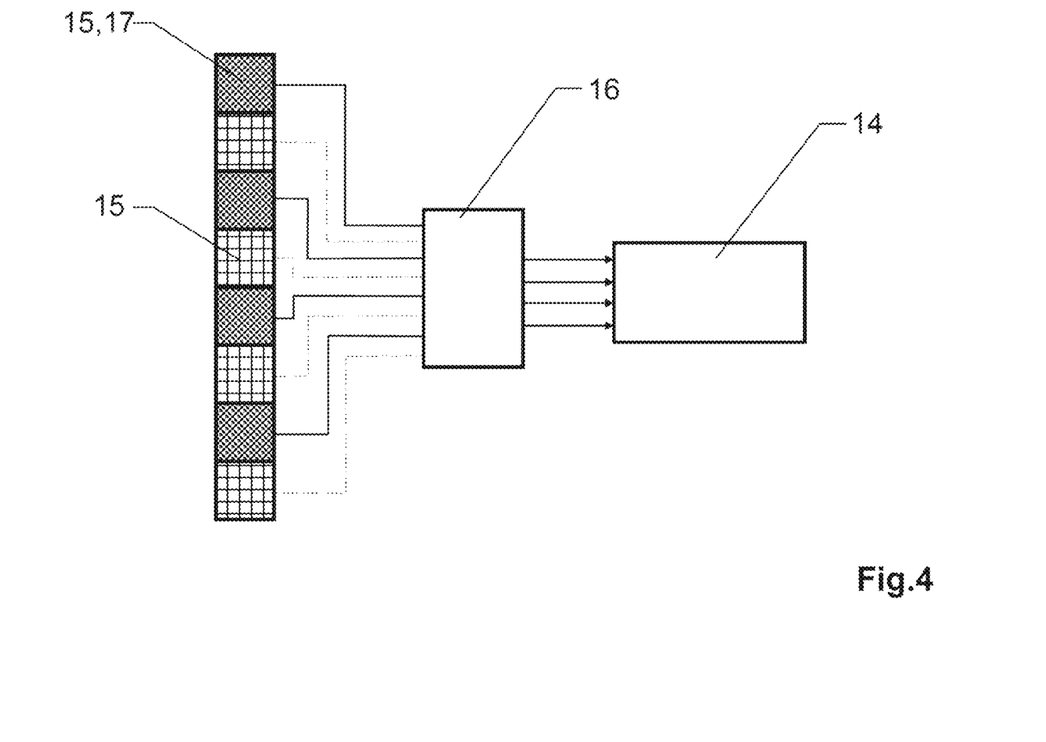
FIG. 4: shows one embodiment of the receiving unit, comprising a multichannel-enabled distance measuring unit for the simultaneous time measurement of a plurality of reception signals of a plurality of distance measurement beams.

FIG. 4 schematically shows one embodiment of the receiving unit of the inventive measuring apparatus, wherein the receiving unit comprises a multichannel-enabled distance measuring unit 14 for the simultaneous time measurement of a plurality of reception signals of a plurality of distance measurement beams.

By way of example, the sensor arrangement comprises eight semiconductor photomultiplier sensors (pixels) 15 arranged in a 1D array, and the multichannel-enabled distance measuring unit 14 comprises four separable distance measurement channels. Furthermore, the receiving unit comprises a channel selector 16 arranged between sensor arrangement and distance measuring unit, e.g. a multiplexer.

The channel selector 16 can assign each of the eight SPM sensors 15 respectively to one of the four distance measurement channels of the multichannel-enabled distance measuring unit 14, wherein the channel selector 16 selects in each case four SPM sensors 17 to be activated and forwards the analog signals thereof in each case to one of the four separable reception channels, which are connected to an FPGA ("field programmable gate array") via a signal convertor, for example. As a time measuring circuit, use is made of a so-called "time-to-delay convertor" (TDC), which is programmed into the FPGA and which is constructed for example on the principle of delay lines (tapped delay lines) with a sequence of signal memories. Instead of an FPGA, a 4-channel analog-to-digital convertor could also be used, for example, which forwards the signals respectively to four separable distance measuring circuits. The waveform digitizing (WFD) method can be used in this case.

Figure 5:
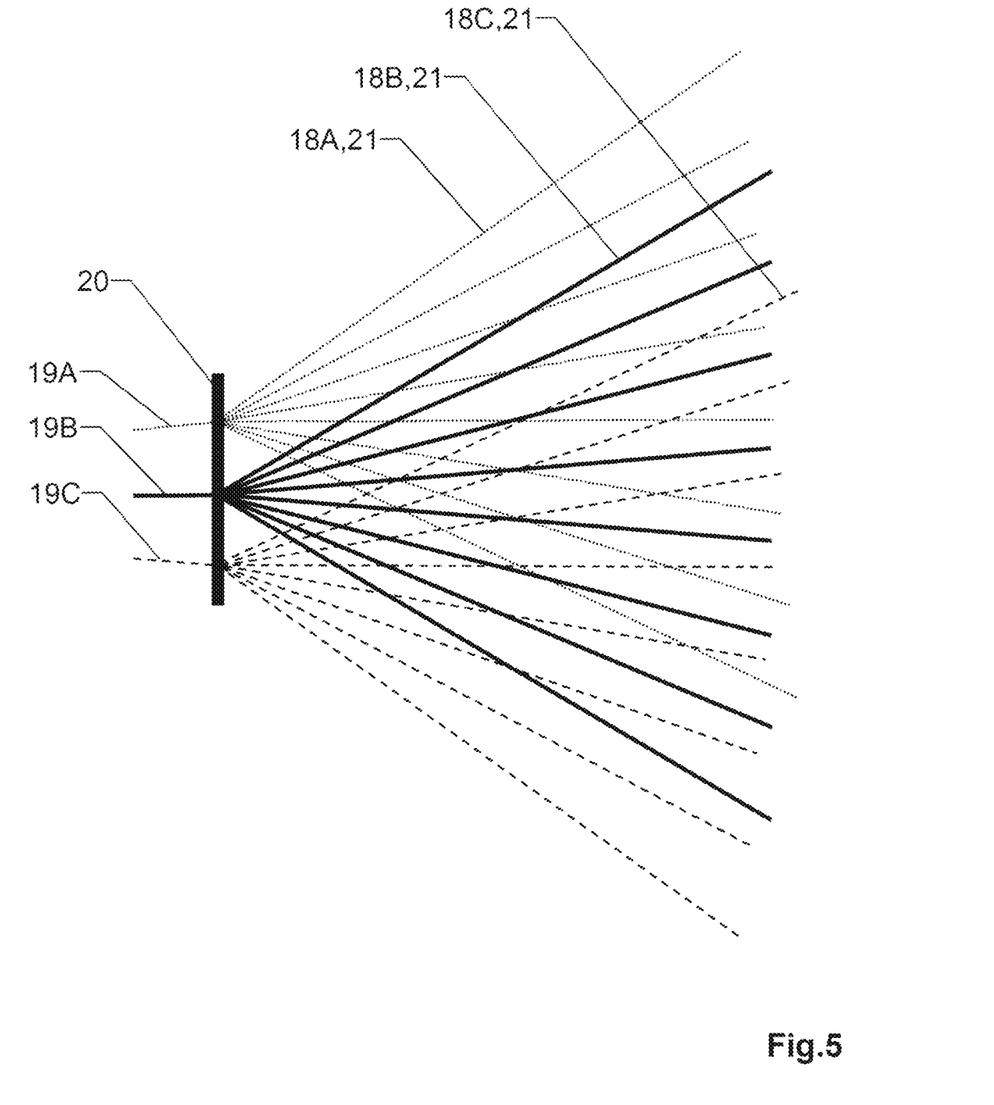
FIG. 5: shows a schematic illustration of three transmission channel groups.
Figure 6:
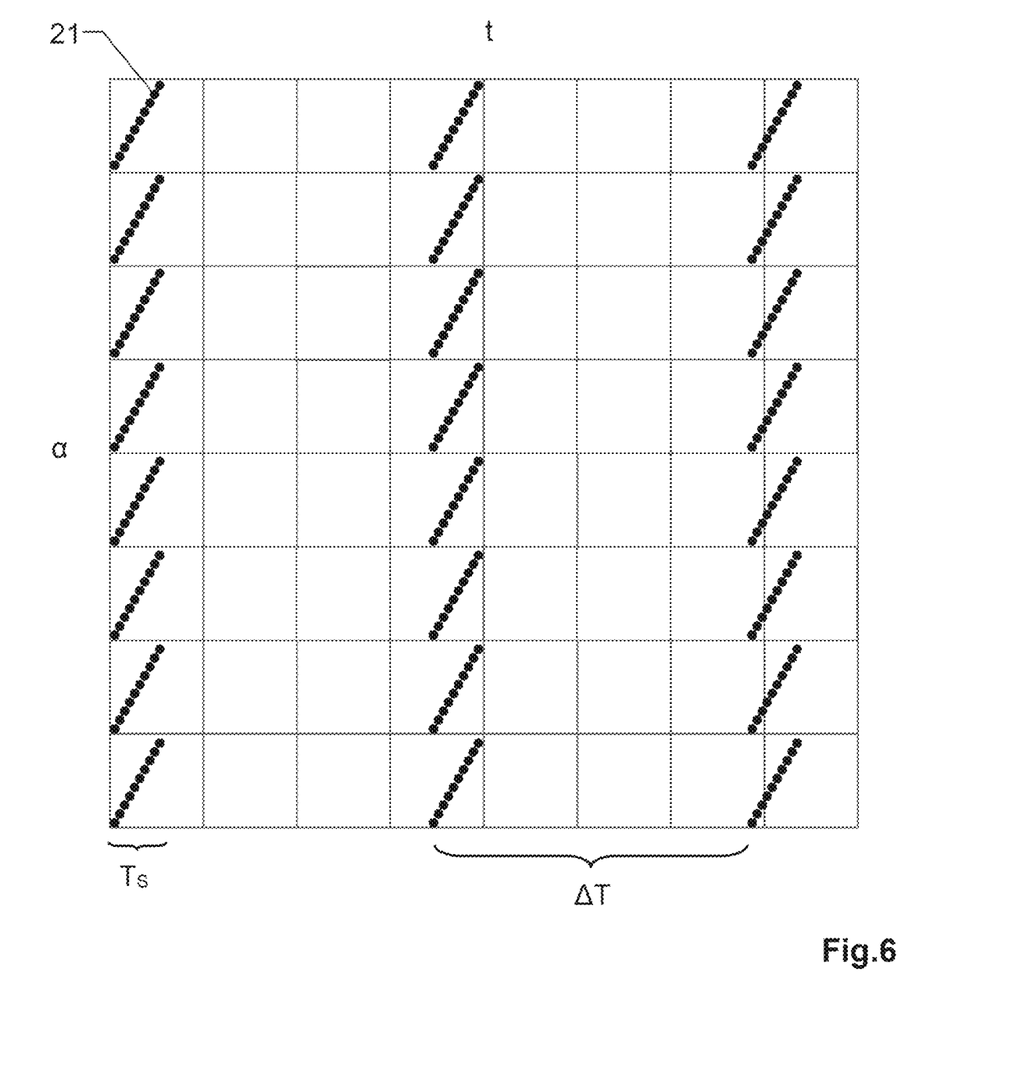
FIG. 6: shows a schematic illustration of transmission channel groups activated in transmission intervals as a function of the transmission time.
Figure 7:
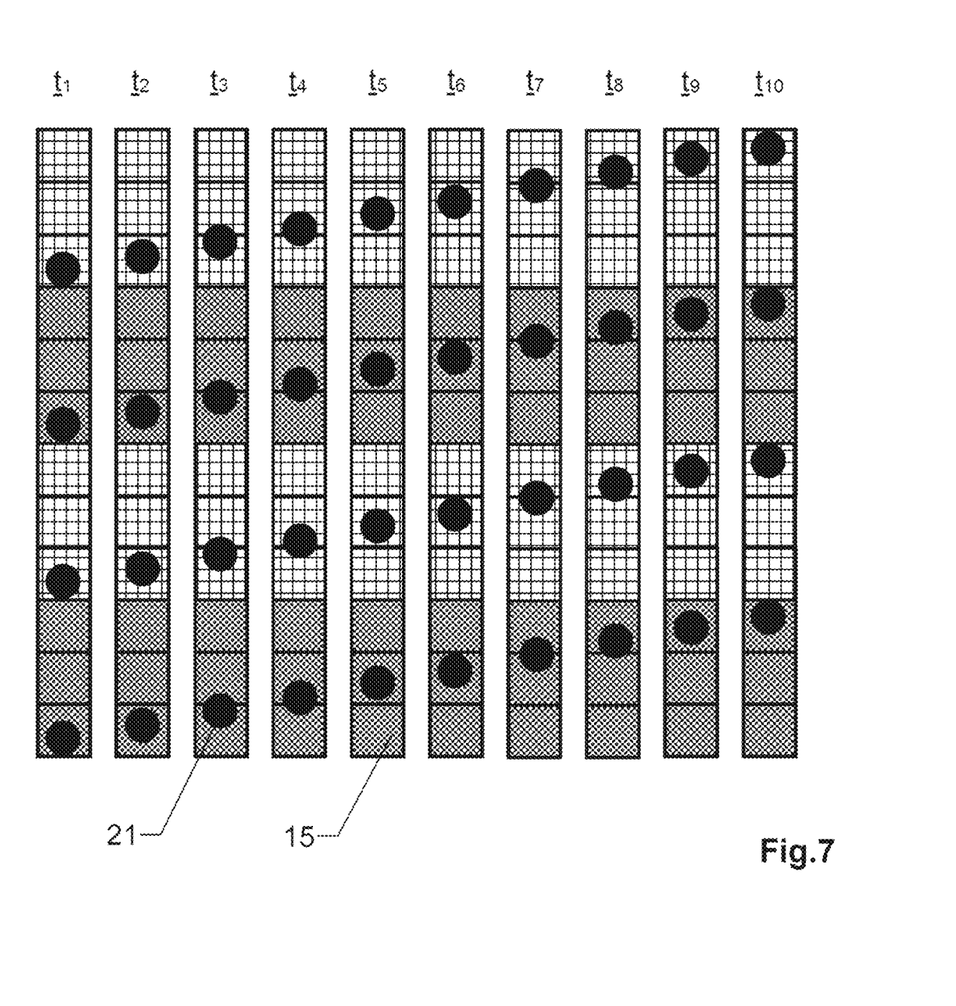
FIG. 7: shows a schematic illustration of a sensor area made from a plurality of SPM sensors and temporal impingement patterns of the distance measurement beams of the distance measurement beams emitted in a transmitter interval on the sensor area.

In particular, the multichannel-enabled distance measuring unit 14 can be used for simultaneously receiving simultaneously emitted distance measurement beams on separable reception channels with assigned distance measuring circuits, i.e. in a further embodiment of the inventive measuring apparatus as illustrated in FIGS. 5 to 7, different transmission channel groups—comprising in each case simultaneously activated transmission channels—being activated in each case temporally successively.

FIG. 5 schematically shows three transmission channel groups 18A, 18B, 18C, which are activated at different points in time, said transmission channel groups being illustrated here in a manner placed one above another in the same figure for the sake of simplicity.

By way of example, the transmission channel groups 18A, 18B, 18C are generated in each case by means of separate laser beam sources. The laser beam sources here generate separate laser beams 19A, 19B, 19C, which impinge on a Dammann grating 20 in each case at different angles (and with different impingement points depending on the embodiment), such that the individual laser beams 19A, 19B, 19C are split in each case into a multiplicity of distance measurement beams 21. The distance measurement beams of a transmission channel group 18A, 18B, 18C have for example an intermediate angle of 1° and the group thus encompasses an angle range of 7°, wherein the transmission channel groups 18A, 18B, 18C are pivoted in each case with respect to one another by an angle of 0.33° or 0.66°, respectively. As a result, the scan field becomes only slightly larger, namely 7.66°, but the object to be scanned is scanned three times more densely.

FIG. 6 schematically shows a variant, wherein the transmission channel groups emitted temporally successively are configured to scan in each case intermediate elevations of elevations scanned by a previously activated transmission channel group. In this regard, ten separate transmission channel groups having in each case differently directed distance measurement beams 21 can be generated for example by means of ten laser beam sources and an eightfold Dammann grating 20, with the result that a total of eighty distance measurement beams 21 scanning different elevations are emitted.

The ten laser beam sources here are activated in each case in quick succession, as a result of which eighty distance measurement beams 21 are generated within a transmission interval $T_s$, wherein the transmission channels are activated with a repetition rate such that a multiplicity of transmission intervals $T_s$ are generated per rotation of the transceiver platform 4 (FIG. 2*a*) about the rotation axis 3.

By way of example, the measuring apparatus is configured such that the transceiver platform rotates at 25 Hz, that is to say that one full revolution (360°) about the rotation axis 3 takes 40 msec. Assuming that 2000 points are arranged in a horizontal plane in the case of this 360° revolution, then 40 ms/2000=20 µsec still remain for generating a vertical point series in a fan. If this fan comprises 80 points, then the average time per measurement point=250 nsec.

The figure schematically shows the distance measurement beams 21 of three successive transmission intervals $T_s$ as a function of the transmission time t and the elevation angle α.

In accordance with this embodiment, the transmission channel groups thus generate in each case an identical scanning pattern which, within a respective transmission interval, is shifted continuously in the same direction (here for example "upward").

Here, moreover, the transmission interval $T_s$ is shorter than the time difference $\Delta T$ between individual transmission intervals $T_s$. As a result, by way of example, the computational complexity for determining the point cloud can be reduced by transmission channels of the same transmission interval $T_s$ being evaluated in each case with respect to an average transmission time of the transmission interval $T_s$.

FIG. 7 schematically shows temporal impingement patterns—corresponding to FIG. 6—of the distance measurement beams 21 on a sensor area comprising an arrangement of a plurality of semiconductor photomultiplier sensors (SPM sensors) 15. The figure shows ten different reception times $t_1$-$t_{10}$ respectively corresponding to the ten transmission channel groups (each comprising eight simultaneously active transmission channels) emitted in a transmission interval.

By way of example, the sensor area comprises twenty-four SPM sensors 15 strung together, wherein each SPM sensor 15 comprises in each case thousands of microcells connected to a common signal output. For the sake of simplicity, however, the figure merely illustrates twelve of the twenty-four SPM sensors, wherein the individual scanning patterns corresponding to the transmission channel groups migrate from bottom to top with each time step.

The distance measurement beams 21 of the different transmission channel groups are thus acquired in each case by means of different SPM sensors 15, wherein as a result of the triple number of SPM sensors 15 in comparison with the respective eight simultaneously active transmission channels of the transmission channel groups, it is possible to provide a large-area sensor area, but without impairing the signal-to-noise ratio proportionally to the sensor area.

In order to save memory space, for example, e.g. in the case of short distances as in the case of interior recordings, the measuring apparatus can furthermore be configured such that not all of the transmission channel groups are activated in each case in individual transmission intervals.

FIG. 8 schematically shows three different spatial views A, B, C of a laser array (laser bar 27) comprising nine laser diodes with corresponding connectors 22 and an insulator substrate 23. By way of example, here each laser diode has three active emission zones stacked one above another. The width of the emission zones of pulsed laser diodes is typically between 75 µm and 350 µm. In order to keep the beam divergence small, preferably the narrowest possible emission zone, for example 75 µm, is used. Optionally, by way of example, a cylindrical rod lens is furthermore positioned near the emission strip, firstly in order to reduce the transverse emission angle, and secondly in order to symmetrize the beam bundle profile.

FIG. 9 shows various views of a commercial laser unit consisting of an array of four laser diodes 24 having microstacked emission zones and a housing 25, wherein the emitting side 26 of the laser array is furthermore indicated in the figure.

It goes without saying that these illustrated figures merely schematically illustrate possible exemplary embodiments. The various approaches can likewise be combined with one another and with methods from the prior art.

The invention claimed is:

1. A measuring apparatus for the three-dimensional geometric acquisition of surroundings, the measuring apparatus comprising:
    a base;
    a transceiver platform which is rotatable about a rotation axis relative to the base, the transceiver platform being configured for rotating a beam exit region and a beam entrance region about the rotation axis;
    a goniometer for acquiring angle data with respect to the angular orientation of the transceiver platform about the rotation axis;
    a transmitting unit having a multiplicity of (n) transmission channels for emitting pulsed distance measurement beams via the beam exit region, wherein in each case a different elevation (α) with respect to a reference plane orthogonal to the rotation axis is scannable with each of the transmission channels;
    a receiving unit configured for acquiring pulsed distance measurement beams returning via the beam entrance region and for generating distance measurement data with respect to the multiplicity of transmission channels; and
    a computing unit configured for deriving a three-dimensional point cloud on the basis of the angle data, the distance measurement data, and arrangement information indicative of the arrangement of the multiplicity of transmission channels, wherein the receiving unit comprises a sensor arrangement of (m) semiconductor photomultiplier sensors, wherein each of the semiconductor photomultiplier sensors comprises in each case a multiplicity of microcells which in each case are based on an internal gain mechanism and operate in the Geiger mode, and the output values of the microcells of a respective semiconductor photomultiplier sensor in each case generate a common output signal, wherein (m) is less than (n), and wherein the transmitting unit and the receiving unit are configured such that at least two of the transmission channels are assigned to a common semiconductor photomultiplier sensor of the sensor arrangement, which sensor is configured for generating the distance measurement data with respect to the at least two transmission channels.

2. The measuring apparatus according to claim 1, wherein:

the receiving unit comprises (k) separable distance measurement channels, wherein (k) is less than or equal to (m), each of the semiconductor photomultiplier sensors of the sensor arrangement is assignable in each case to one of the (k) separable distance measurement channels, and each of the (k) separable distance measurement channels is configured for generating distance measurement data with respect to a semiconductor photomultiplier sensor of the sensor arrangement that is assigned to it.

3. The measuring apparatus according to claim 2, wherein:

the transmitting unit is configured to activate a group of (k) simultaneously activated transmission channels of the multiplicity of transmission channels as a first transmission channel group, and the transmitting unit and the receiving unit are configured such that the first transmission channel group, the sensor arrangement, and the separable distance measurement channels are activatable in a manner coordinated with one another, such that output signals of the sensor arrangement with respect to the (k) transmission channels of the first transmission channel group are acquirable simultaneously.

4. The measuring apparatus according to claim 3, wherein:

the transmitting unit is configured to activate the multiplicity of transmission channels in such a way that a sequence of transmission intervals ($T_s$), is generated, wherein during a respective transmission interval ($T_s$), the first transmission channel group is activated, at least one further group of simultaneously activated transmission channels of the multiplicity of transmission channels is activated as second transmission channel group, the first and second transmission channel groups are activated temporally successively in the respective transmission interval ($T_s$), the second transmission channel group is configured to scan intermediate elevations of elevations scanned by the first transmission channel group, and the transmitting unit and the receiving unit are configured such that the second transmission channel group, the sensor arrangement, and the separable distance measurement channels are activatable in a manner coordinated with one another, such that output signals of the sensor arrangement with respect to the transmission channels of the second transmission channel group are acquirable simultaneously.

5. The measuring apparatus according to claim 4, wherein the transmitting unit is configured to generate the sequence of transmission intervals ($T_s$) in such a way that the ratio of the transmission interval ($T_s$) to the time difference ($\Delta T$) between successive transmission intervals ($T_s$) of the sequence of transmission intervals is less than 0.5.

6. The measuring apparatus according to claim 2, wherein the sensor arrangement comprises at least two times (k) semiconductor photomultiplier sensors, wherein the receiving unit is configured such that each of the at least two times (k) semiconductor photomultiplier sensors is assignable in each case to one of the separable distance measurement channels.

7. The measuring apparatus according to claim 1, wherein:

the receiving unit comprises a channel selector, a data memory, and a distance measuring unit, the channel selector is configured for selecting a group of semiconductor photomultiplier sensors of the sensor arrangement and for forwarding output signals of the group of semiconductor photomultiplier sensors to the data memory, the data memory is configured for storing data with respect to the output signals of the group of semiconductor photomultiplier sensors, and the distance measuring unit is configured for parallel or sequential generation of distance measurement data with respect to at least one portion of the semiconductor photomultiplier sensors of the group of semiconductor photomultiplier sensors.

8. The measuring apparatus according to claim 1, wherein the transmitting unit comprises:

at least one laser beam source configured for generating a pulsed laser beam, an optical beam splitter configured for splitting the pulsed laser beam into a plurality of pulsed partial beams, and wherein the transmitting unit is configured for generating the multiplicity of transmission channels on the basis of the plurality of pulsed partial beams of the pulsed laser beam.

9. The measuring apparatus according to claim 8, wherein the optical beam splitter comprises at least one of the following:

a Dammann grating, a fiber-optic splitter, a holographic element, and a diffractive optical element.

10. The measuring apparatus according to claim 8, wherein the transmitting unit is configured such that:

the angle of incidence and/or the impingement point of the laser beam on the optical beam splitter is settable, and the multiplicity of transmission channels is generated on the basis of different settings of the angle of incidence or impingement point of the laser beam.

11. The measuring apparatus according to claim 1, wherein the transmitting unit for generating the multiplicity of transmission channels comprises at least one of the following components:

a laser diode, a stripe laser, and a laser bar.

12. The measuring apparatus according to claim 1, wherein:
 the transmitting unit is configured for generating a first laser beam arrangement for providing a first scanning density, wherein the transmitting unit comprises a beam splitter unit configured for splitting the first laser beam arrangement into a second laser beam arrangement,
 the second laser beam arrangement provides a higher scanning density than the first laser beam arrangement, wherein the transmitting unit is configured:
  for coupling the beam splitter unit into and out of a beam path of the transmitting unit,
  for generating the multiplicity of transmission channels as a coarse scanning pattern on the basis of the first laser beam arrangement, and
  for generating the multiplicity of transmission channels as a fine scanning pattern on the basis of the second laser beam arrangement.

13. The measuring apparatus according to claim 1, wherein:
 the transmitting unit is configured for generating a beam pattern made from distance measurement beams,
 the transmitting unit comprises a deflection unit configured for setting a direction of propagation of at least one part of the beam pattern, and
 the transmitting unit is configured for generating the multiplicity of transmission channels on the basis of different settings of the direction of propagation of the at least one part of the beam pattern.

14. The measuring apparatus according to claim 1, wherein:
 at least one part of the transceiver platform is tiltable by a tilt angle with respect to the rotation axis, and
 the multiplicity of transmission channels is generated on the basis of differently set tilt angles.

15. The measuring apparatus according to claim 1, wherein the receiving unit comprises a time acquisition unit having at least one of the following arrangements:
 a multichannel wavefront digitizer,
 a multichannel threshold value discriminator unit with time-to-delay convertors connected downstream, and
 a field programmable gate array with multichannel time acquisition logic programmed in.

* * * * *